United States Patent
Appell et al.

(10) Patent No.: US 7,835,774 B1
(45) Date of Patent: Nov. 16, 2010

(54) REMOVAL OF LOCAL DUPLICATION VOICE ON CONFERENCE CALLS

(75) Inventors: Jennifer M. Appell, Dallas, TX (US); Srikanth Chilakapati, Murphy, TX (US); Stanley R. Hall, Irving, TX (US); Andrew W. Lang, Epping (AU); Leonel R. Saenz, Carrollton, TX (US)

(73) Assignee: Avaya Inc., Basking Ridge, NJ (US)

( * ) Notice: Subject to any disclaimer, the term of this patent is extended or adjusted under 35 U.S.C. 154(b) by 705 days.

(21) Appl. No.: 11/520,146

(22) Filed: Sep. 12, 2006

(51) Int. Cl.
*H04M 9/08* (2006.01)

(52) U.S. Cl. ............ 455/570; 379/406.01; 379/406.04; 379/406.15

(58) Field of Classification Search .................. 379/406, 379/158, 207.1, 388.01
See application file for complete search history.

(56) References Cited

U.S. PATENT DOCUMENTS

| | | | | |
|---|---|---|---|---|
| 5,434,912 A | * | 7/1995 | Boyer et al. | 379/202.01 |
| 5,631,900 A | * | 5/1997 | McCaslin et al. | 379/406.04 |
| 5,737,406 A | | 4/1998 | Dagberg et al. | |
| 5,737,408 A | | 4/1998 | Hasegawa | |
| 5,848,146 A | * | 12/1998 | Slattery | 379/406.01 |
| 5,867,574 A | | 2/1999 | Eryilmaz | |
| 6,434,110 B1 | * | 8/2002 | Hemkumar | 370/201 |
| 7,180,869 B2 | * | 2/2007 | Spencer | 379/406.01 |
| 2002/0101982 A1 | * | 8/2002 | Elabd | 379/406.01 |
| 2003/0026417 A1 | * | 2/2003 | Belt et al. | 379/387.01 |
| 2005/0285935 A1 | * | 12/2005 | Hodges et al. | 379/14.01 |
| 2005/0286443 A1 | * | 12/2005 | McMillen et al. | 370/260 |

FOREIGN PATENT DOCUMENTS

EP 0 765 066 A2 * 3/1997
WO WO 9953674 A1 * 10/1999

OTHER PUBLICATIONS

Usher, John, A Multi-Filter Approach to Acoustic Echo Cancellation for Teleconferencing, (2004), 75th Meeting of the Acoustical Society of America, New York, May 24-28, 7 pages.

* cited by examiner

*Primary Examiner*—Matthew D Anderson
*Assistant Examiner*—Gennadiy Tsvey
(74) *Attorney, Agent, or Firm*—Sheridan Ross P.C.

(57) ABSTRACT

The present invention provides mechanisms for removing duplicate signals during a communication session. More particularly an over-air signal is received at a given endpoint and a stream of electronic data is monitored at the same endpoint for a duplicate to the over-air signal. If a duplicate is detected in the electronic data stream, it is removed so that only one occurrence of the signal is received at the endpoint.

21 Claims, 5 Drawing Sheets

REMOVAL OF LOCAL DUPLICATION VOICE ON CONFERENCE CALLS

FIELD OF THE INVENTION

The present invention is directed generally to telephony and signal processing systems and specifically to duplicate signal cancellation methods employed by such systems.

BACKGROUND OF THE INVENTION

Today's business world is focusing more on collaboration and sharing of ideas. To facilitate the sharing of ideas and open collaboration between employees many employers are designing work facilities with an open and communal feeling. Temporary partitions are used in these facilities to define employee workspace. The partitions do not generally extend from the floor to the ceiling and thus sound can travel between employee workspace with relative ease.

One downside to this type of work facility is that many employees can hear what another employee is saying or doing when both employees are in their respective workspaces. Even more frustrating is when a conference call is organized with several participants in an open-plan facility. During these conference calls, some participants in the same office space will often take the call at their desk rather than meeting at a conference room or the like. This may occur because the participants need to have access to their computer at their desk or need to reference other documents at their desk. Regardless of the reason, whenever participants to a common conference call are seated relatively near each other but are participating using different communication devices, there is the chance that one or both participants will be able to hear each other through the air as well as over the conference call.

The participants will likely hear these two signals (i.e., an over-air signal and an electronic signal) at two distinct times. The over-air signal is typically received first since it travels on a local direct air path from the speaking participant to the receiving participant. The electronic representation of the same signal coming through the conference call is typically received second. The amount of delay between reception of the over-air signal and the electronic signal may depend upon the number of conference participants, the type of conferencing hardware being employed, the type of signal processing methods being employed, and other considerations. The delay between reception of the over-air signal and the electronic signal may range between a couple of microseconds to a few seconds. This delay can become very disconcerting and distracting for a participant during a conference call.

Also, employees on the same "project team" are generally seated near one another during a conference call. Sitting project team members near one another, while effective for helping increase their collaboration, further increases the chances of the team members encountering a situation where they will hear one another over the air and over the phone during a conference call.

SUMMARY

These and other needs are addressed by various embodiments and configurations of the present invention. The present invention is directed generally to signal processing methods and systems. More specifically, mechanisms for canceling out local duplicate signals are provided herein.

In accordance with one embodiment of the present invention, a method of processing a sound signal is provided. The method generally comprises the steps of:

(a) detecting a first over-air signal having a first set of characteristics;

(b) monitoring a call for a second electrical signal having a second set of characteristics substantially similar to the first set of characteristics;

(c) detecting the second electrical signal; and (d) in response to step (c), performing at least one of the following:

(i) canceling out substantially the detected second electrical signal from the call;

(ii) increasing a volume of the call to render the detected first over-air signal substantially inaudible in comparison to the detected second electrical signal; and (iii) substantially muting the call to render the detected second electrical signal substantially inaudible in comparison to the detected first over-air signal.

By performing one or more of the substeps in step (d), a recipient of an over-air signal will not need to endure listening to an electronic representation of the same over-air signal. In another alternative, the volume of the call will be such that the recipient of both signals can easily ignore the over-air signal. Since the electrical signal is generally received after the over-air signal is received (i.e., due to the typical delays inherent in call routing and processing), a potential recipient of both signals is relieved of the distraction associated with hearing the same thing twice from two different sources at two different times.

In one embodiment, the "over-air" signal is transmitted, received, and heard by a recipient as an acoustic wave signal. The over-air signal is generally uttered by a person sitting within proximity to the recipient that also happens to be on the same call as the recipient. Thus, the over-air signal is initially received by an acoustic wave signal to electronic signal transducer (e.g., a microphone) near the recipient. The received over-air signal can then be analyzed and certain characteristics of the over-air signal can be determined. Since the electronic signal from the call will be delayed for a small amount of time (e.g., a couple milliseconds), the call can be monitored for the arrival of the electronic signal that is a "duplicate" to the received over-air signal. Once the "duplicate" electronic signal is received, the call can be adjusted such that the electronic signal is essentially inaudible for the recipient that just heard the over-air signal.

To determine if a particular user is receiving duplicate local signals, characteristics of over-air signals and electronic call signals need to be compared. The characteristics that are compared to determine if substantially similar or identical signals are being received may include any number of known voice, call, and identity characteristics. Examples of characteristics that may be monitored and compared include frequency, pitch, tone, amplitude, words, speaker identity, and overall waveform (e.g. as might be compared using a Fast Fourier Transform (FFT) to correlate the signals). If one or more of the characteristics match between the over-air signal and the electronic signal, then it may be determined that local duplicate signals exist. Based on the determination the electronic version of the local duplicate signal may be cancelled or otherwise rendered inaudible.

These and other advantages will be apparent from the disclosure of the invention(s) contained herein. The above-described embodiments and configurations are neither complete nor exhaustive. As will be appreciated, other embodiments of the invention are possible utilizing, alone or in combination, one or more of the features set forth above or described in detail below.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

DETAILED DESCRIPTION

The invention will be illustrated below in conjunction with an exemplary communication system. Although well suited for use with, e.g., a system using server(s), the invention is not limited to use with any particular type of communication system or configuration of system elements. Those skilled in the art will recognize that the disclosed techniques may be used in any communication application in which conference call participants will likely hear one another over the phone and over the air at two distinct times.

Figure 1:
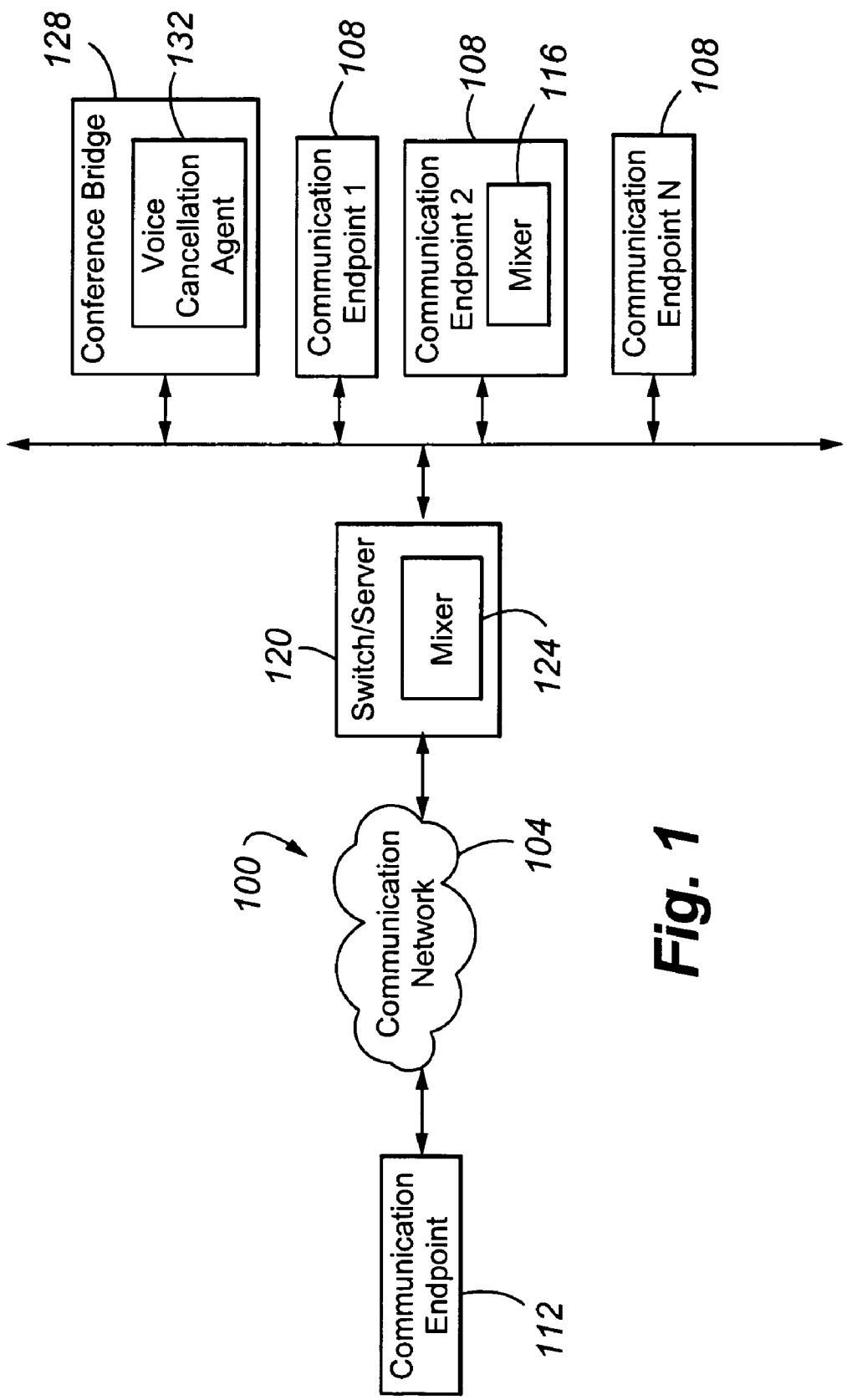
FIG. 1 is a block diagram depicting a communication system in accordance with embodiments of the present invention.

Referring initially to FIG. 1 an exemplary communication system 100 will be described in accordance with at least some embodiments of the present invention. The depicted communication system 100 comprises a communication network 104 connecting a plurality of communication endpoints 108 and/or communication endpoint 112 through a switch/server 120 or the like.

The communication network 104 may comprise any type of information transportation medium and may use any type of protocols to transport messages between endpoints. The communication network 104 may include wired and/or wireless communication technologies. Examples of the communication network 104 include, without limitation, a standard Plain Old Telephone System (POTS), an Integrated Services Digital Network (ISDN), a Public Switched Telephone Network (PSTN), a Local Area Network (LAN), a Wide Area Network (WAN) like the Internet, and any other type of packet-switched or circuit-switched network known in the art.

The communication endpoints 108, 112 may be packet-switched or circuit-switched and can include, for example, IP hardphones such as the Avaya Inc.'s, 4600 Series IP Phones™, IP softphones such as Avaya Inc.'s, IP Softphone™, Personal Digital Assistants or PDAs, Personal Computers or PCs, laptops, packet-based H.320 video phones and conferencing units, packet-based voice messaging and response units, packet-based traditional computer telephony adjuncts, and conventional wired or wireless telephones.

One or more of the communication endpoints 108 may further include a mixer 116. The mixer can be used to connect multiple communication endpoints 108, 112 during a conference call. Typically the number of endpoints allowed on a conference facilitated by the mixer 116 is limited. Accordingly, endpoints 108, 112 in a relatively small conference call can be connected using mixer 116.

However, in embodiments where a relatively large number of participants are engaged in the conference call a conference bridge 128 may be employed. The conference bridge 128 may include dedicated server/switch functionality designed for facilitating large conference calls. The conference bridge 128 generally receives signals from each communication endpoint 108, 112 and mixes them together for transmission to all other communication endpoints 108, 112 during a conference call.

The conference bridge 128 may further be equipped with a voice cancellation agent 132. The voice cancellation agent 132 is designed to remove or otherwise render local duplicate signals inaudible for a particular communication endpoint 108. More specifically, the communication endpoints 108 are generally associated with a common enterprise and thus are connected to the communication network 104 through a common switch/server 120. Since these communication endpoints 108 are associated with a common enterprise they are likely to be located next to one another. Especially in an open office design only a few feet and a partition may separate the communication endpoints 108. It is therefore likely that users of the communication endpoints 108 may engage in a common conference call using their own endpoints 108. When one participant is within an audible distance of another conference call participant, and thus is in a position to receive an over-air signal and an electrical signal from the other participant, the duplicate electronic version of the signal can be rendered inaudible from the receiving participant's version of the conference call so that he/she does not have to listen to the same thing twice.

The voice cancellation agent 132 on the conference bridge 128 may perform the function of detecting duplicate electronic versions of a signal already received as an over-air signal by one or more communication endpoints 108, 112. The voice cancellation agent 132 may also be operable to render such duplicate electronic signals practically inaudible for a user of the communication endpoint 108, 112 that has already received an over-air version of the same. The voice cancellation agent 132 selectively leaves the electronic signal for those endpoints 108, 112 that have not received the over-air signal.

In one embodiment, the switch/server 120 may include a private branch exchange (PBX) system or any similar type of switching system capable of providing a telephone service to an enterprise associated with the switch/server 120. The switch/server 120 may be one of a number of known exchange systems including, but not limited to, Private Automated Branch Exchange (PABX), Computerized Branch Exchange (CBX), Digital Branch Exchange (DBX), or Integrated Branch Exchange (IBX). The switch/server 120 may also comprise a mixer 124 that provides for the simultaneous connection of multiple endpoints such as communication endpoints 108, 112. The mixer 124 provides the functionality to direct incoming and/or outgoing calls to various endpoints and further provides for conferencing capabilities between a relatively large number of endpoints 108, 112.

The term "switch" or "server" as used herein should be understood to include a PBX, an enterprise switch, an enterprise server, or other type of telecommunications system switch or server, as well as other types of processor-based communication control devices such as mailbox servers (i.e., email servers, voicemail servers, videomail servers and the like) and other media servers such as web servers, computers, adjuncts, etc.

It should be emphasized that the configuration of the server, user communication devices, and other elements as shown in FIG. 1 is for purposes of illustration only and should not be construed as limiting the invention to any particular arrangement of elements.

Figure 2:
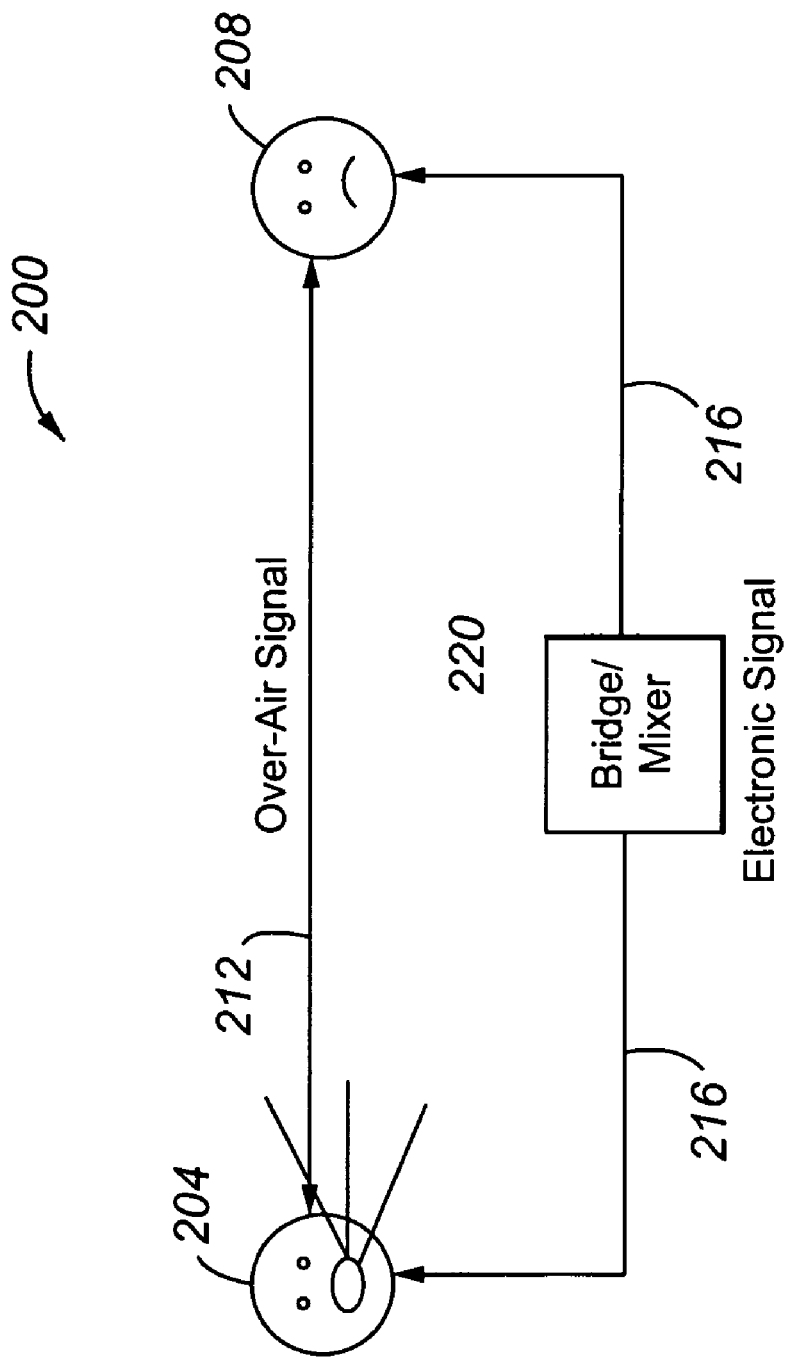
FIG. 2 is a block diagram depicting an exemplary office setting in accordance with embodiments of the present invention.

FIG. 2 depicts a block diagram 200 showing a typical situation encountered when communication endpoints 108, 112 are relatively close to one another. Each communication endpoint 108, 112 is associated with a different participant. In other words, a first participant 204 engages in a conference call using a first communication endpoint 108, 112 and a second participant 208 engages in the call using a second communication endpoint 108, 112. In the prior art, when first and second communication endpoints 108, 112 were within an audible distance 220 to one another, the first participant 204 would speak and the second participant 208 would receive both an over-air signal 212 and an electronic signal 216.

The electronic signal 216 received by the second participant 208 may be a summation of signals from all conference call participants. Therefore, the sounds made by the first participant 204 are transmitted as a part of the total electronic signal received by the second communication device 108, 112. In accordance with at least one embodiment of the present invention, the portion of the received electronic signal corresponding to the over-air signal is removed from the total signal or rendered inaudible within the total signal. This way the second participant 208 only has to listen to one version of the sounds made and words spoken by the first participant 204. In accordance with alternative embodiments, the electronic signal 216 sent by the first participant 204 may not be added to the total electronic signal that is ultimately destined for the second participant 208. In other words, the signal processing of the electronic signal 216 may be performed prior to mixing the signals from all conference participants. As can be appreciated by one of skill in the art, the mixing of the electronic signals may be performed at various points within the communication system 100, either wholly or in part. Likewise, voice cancellation or similar signal processing steps may be performed within various devices of the communication system 100 either in a distributed fashion or by a single device.

Figure 3:
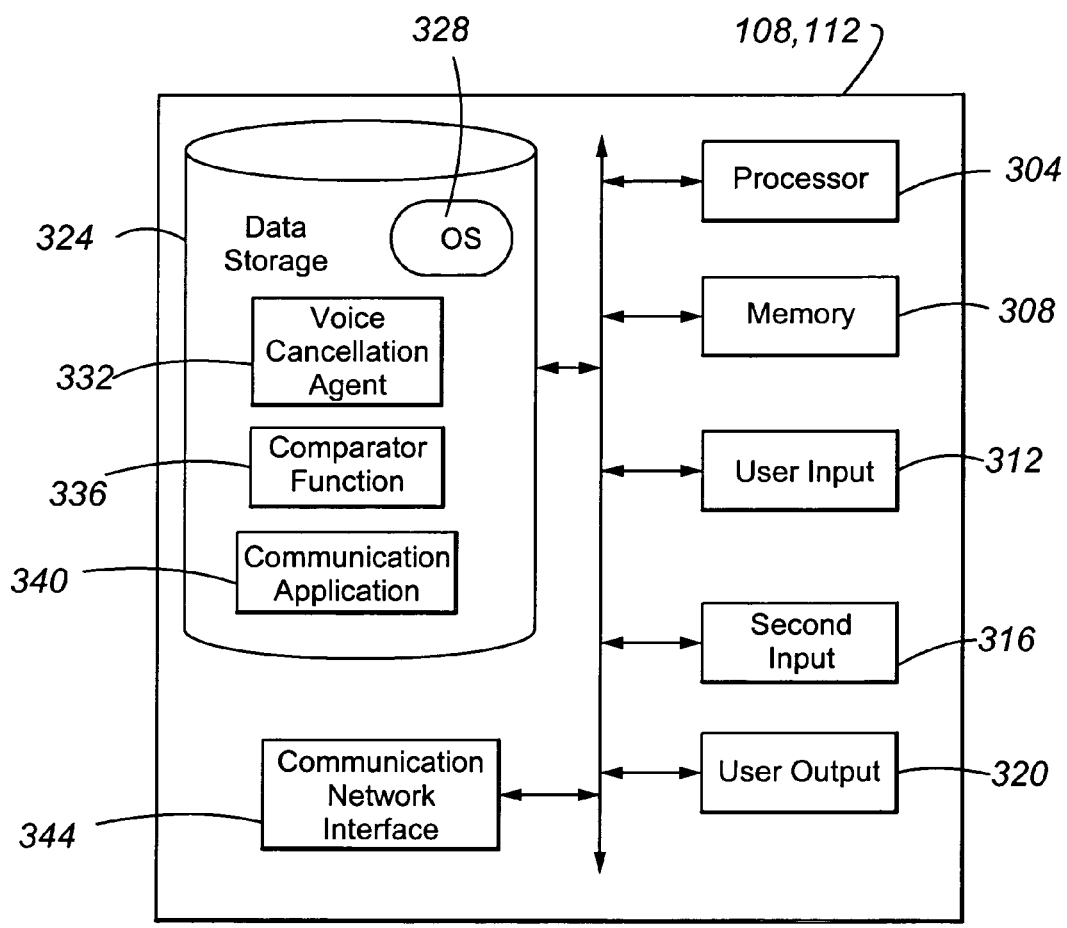
FIG. 3 is a block diagram depicting a communication device in accordance with embodiments of the present invention.

Referring now to FIG. 3, an exemplary communication endpoint 108, 112 will be described in accordance with embodiments of the present invention. The components of the communication endpoint 108, 112 may include a processor 304 capable of executing program instructions. Accordingly, the processor 304 may include any general-purpose programmable processor or controller for executing application programming. Alternatively, the processor 304 may comprise a specially configured application specific integrated circuit (ASIC). The processor 304 generally functions to run programming code implementing various of the functions performed by the user communication endpoint 108, 112, including voice cancellation and local duplicate signal removal functions as described herein.

A user communication endpoint 108, 112 may additionally include memory 308 for use in connection with the execution of programming by the processor 304 and for the temporary or long-term storage of data or program instructions. The memory 308 may comprise solid-state memory resident, removable or remote in nature such as DRAM and SDRAM. Where the processor 308 comprises a controller, the memory 308 may be integral to the processor 304. In addition, various input devices 312 and user output devices 320 may be provided. Examples of input devices 312 include a keyboard, numeric keypad, microphone, and pointing device combined with a screen or other position encoder. Examples of output devices 320 include a video display, an alpha-numeric display, a speaker, a ringer, a printer port or indicator lights.

A second input 316 may further be included as part of the communication endpoint 108, 112. The second input 316 is used to detect sound signals from persons and things other than a user of the communication endpoint 108, 112, whereas the user input 312 is intended as an interface for the user of the communication endpoint 108, 112.

A user communication endpoint 108, 112 may also include data storage 324 for the storage of application programming and/or data. For example, operating system software 328 may be stored in the data storage 324. Examples of applications that may be stored in the data storage 324 include a voice cancellation agent 332. The voice cancellation agent 332 may comprise instructions for removing or rendering inaudible electronic signals that are essentially duplicates to over-air signals received at the second input 316. The voice cancellation agent 332 may also include instructions for increasing the volume of the call and not removing the duplicated voice signal. By increasing the volume of the call, the electronic signal to over-air signal (i.e., noise) ratio may be increased, thus making it easier for the user to ignore the over-air signal.

The data storage 324 may further include a comparator function 336. The comparator function 336 may be designed to compare signals received at the second input 316 with signals that are ultimately destined for transmission to the user via the user output 320. The comparator function 336 may include instructions for comparing various characteristics of over-air signals with characteristics of electronic signals. The activity of the voice cancellation agent 332 may be based in part upon the analysis of signals performed by the comparator function 336.

Another example of an application that may be stored in data storage 324 includes a communication or telephony application 340. For example, a user communication endpoint 104 may include a communication application 340 comprising instructions for performing telephony functions in support of telephony communications. As a further example, a messaging server 108 may comprise a communication application for supporting telephony or textual messages. The data storage 324 may also provide storage for message data. Accordingly, it can be appreciated by one of skill in the art after consideration of the present disclosure that a voice cancellation agent 332 and comparator function 336 may be implemented by programming or instructions on a user communication endpoint 108, 112 itself, with or without cooperating applications running on a conference bridge 128 or similar type of server.

A user communication endpoint 108, 112 may also include one or more communication network interfaces 344. For example, a user communication endpoint 108, 112 may include a communication network interface 344 comprising a network interface card (NIC), a modem, a telephony port, a serial or parallel data port, or other wireline or wireless communication network interface.

Figure 4:
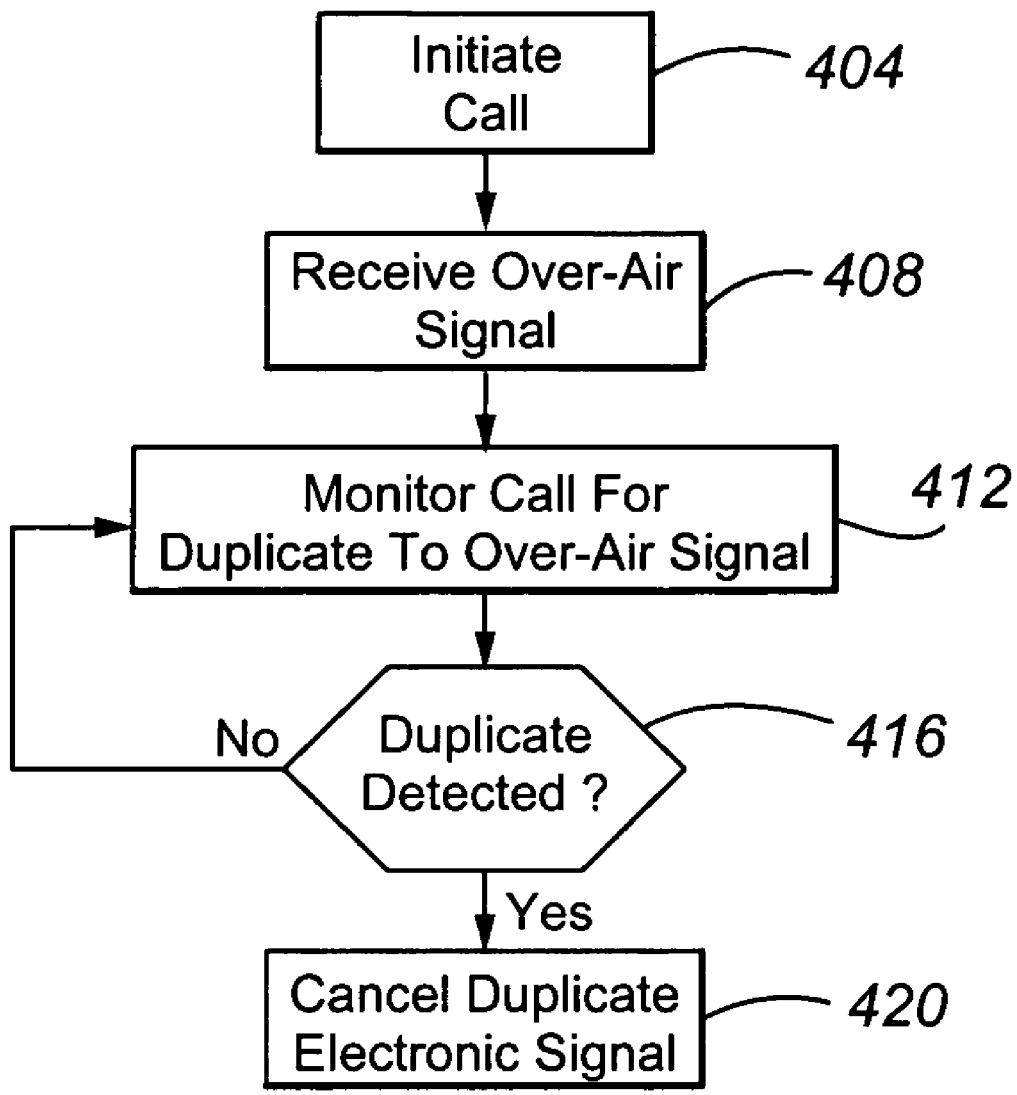
FIG. 4 is a flow chart depicting a method of processing a signal in accordance with embodiments of the present invention.

Referring now to FIG. 4, a method of processing a voice signal during a conference call will be described in accordance with embodiments of the present invention. Initially, the method begins when a call is initiated (step 404). The call is generally a conference call between three or more participants. Two of those participants are participating in the conference call using different communication endpoints 108, 112 that are within an audible distance from one another. In other words, when a participant speaks at the location of the first communication endpoint 108, 112 the participant at the location of the second communication endpoint 108, 112 can hear what the speaking participant is saying through air transmitted signals.

As the conference call proceeds one of those conference call participants makes a sound and another participant receives the over-air sound signal (step 408). In most cases the received over-air signal corresponds to speech uttered by the speaking participant. However, as can be appreciated by one skilled in the art, the over-air signal received by the recipient participant may not necessarily correspond to speech signals. Rather, the received over-air signal may correspond to another type of sound made by the participant. The second input 316 of the communication endpoint 108, 112 as well as, assumingly, the ear of the participant associated with the same communication endpoint 108, 112 receive the sound.

When the sound is received by the communication endpoint 108, 112, the call is monitored for a duplicate electronic version of the over-air signal (step 412). In this step the characteristics of the over-air signal (e.g., frequency, pitch, tone, amplitude, words, speaker identity, and overall waveform characteristics) are monitored. Characteristics such as frequency, pitch, tone, and amplitude can be directly monitored and compared by the comparator function 336. Other characteristics such as words and speaker identity require additional signal processing to determine what words are being spoken and potentially who is saying them. In an alternative embodiment, the participant that is receiving the additional over-air signal may indicate to the communication endpoint 108, 112 that a particular user is being heard twice by, for example, pressing a button when that person speaks. The voice cancellation agent 132, 332 may then determine that any voice signals transmitted from that speaker should not be sent on to the participant receiving the over-air signal.

In step 416 it is determined if a duplicate electronic signal to the received over-air signal has been detected. If no detection of a duplicate electronic signal has occurred, then the call continues to be monitored. Once a duplicate electronic signal has been detected (i.e., an electronic signal has been detected having some characteristics that substantially match the characteristics of the received over-air signal), the duplicate electronic signal is canceled from the call or otherwise rendered inaudible for the participant that has received the over-air signal (step 420). The cancellation of the electronic version of the received over-air signal may be performed by adding a signal to the total signal that cancels out the electronic duplicate from the total signal. Alternatively, the electronic version of the signal may never be added to the total signal.

As noted above, this step of cancellation may alternatively include increasing the call volume of the user output 320 such that the difference between call volume and over-air signal volume is great enough that the over-air signal volume can be more easily ignored. The duplicate electronic signal may be removed from the total signal in a number of other known ways that will be appreciated by one skilled in the art after reading this disclosure.

Figure 5:
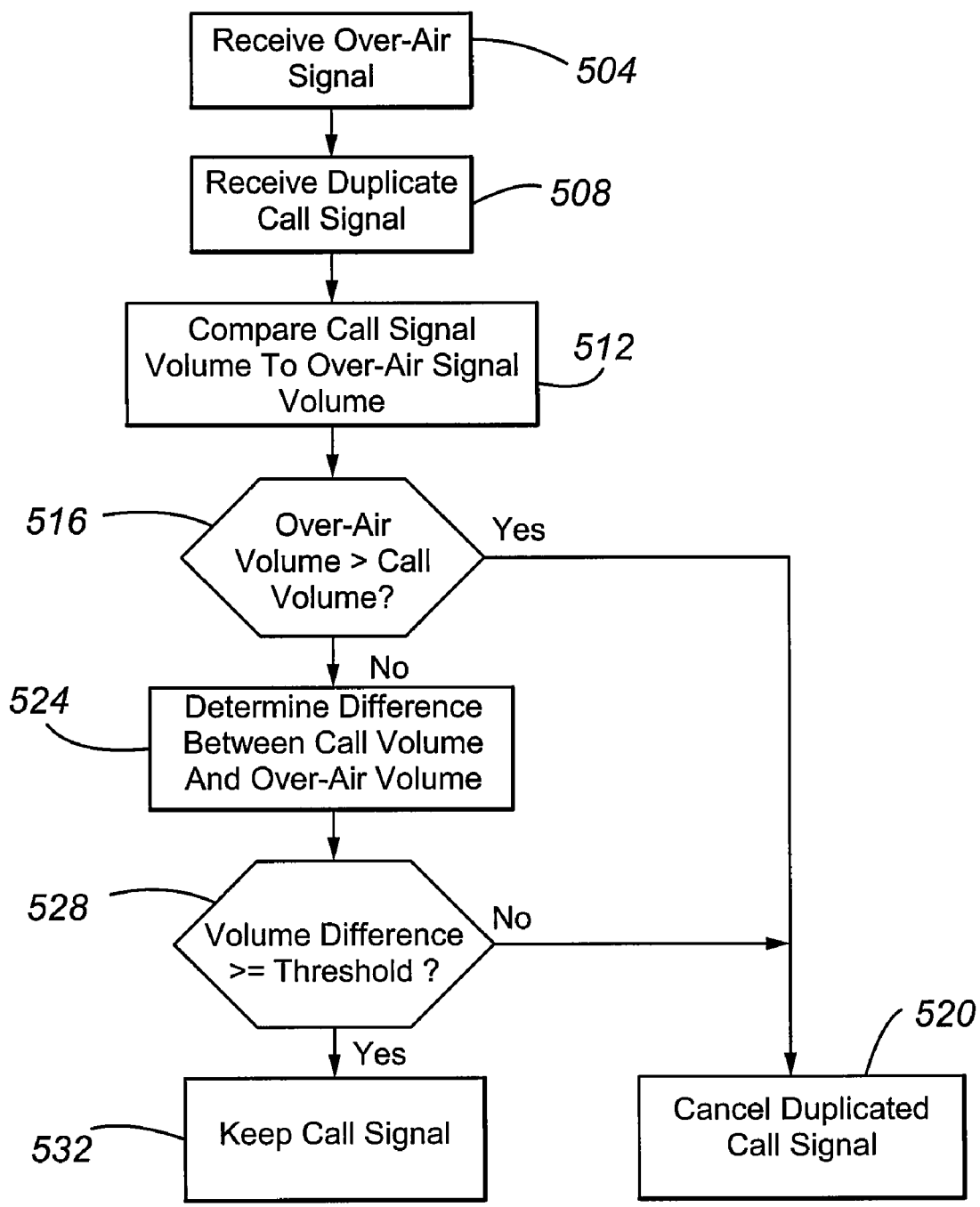
FIG. 5 is a flow chart depicting a method of employing a volume difference threshold to process a call signal in accordance with embodiments of the present invention.

FIG. 5 depicts a method of employing a volume difference threshold between a received over-air signal and an electronic duplicate of the same in accordance with embodiments of the present invention. The method begins when the over-air signal is received at the communication endpoint 108, 112 (step 504). Thereafter, an electronic duplicate of the same is received as a part of the call (step 508). The electronic duplicate may be received prior to or after the mixing of all signals from the conference.

Once the over-air signal and it's electronic duplicate in the call are received, the call signal volume is compared to the over-air signal volume (step 512). In step 516, it is determined if the over-air volume exceeds the volume of the call signal. In the event that the over-air volume is greater than the call signal volume, then the method proceeds to cancel the duplicated electronic signal in the call as discussed above in relation to FIG. 4 (step 520). However, in the event that the over-air volume is not greater than the call signal volume, then the difference between the call signal volume and the over-air volume is determined (step 524). In this step, the average call volume or root mean square (RMS) of the total amplitude of the call signal may be subtracted from the average call volume or RMS of the total amplitude of the received over-air signal. Alternatively, the maximum amplitudes of each signal may be subtracted to determine a difference between signal volumes.

Once a volume difference has been determined for the duplicated signals, it is determined if the volume difference one of meets and exceeds a predetermined threshold (step 528). The predetermined threshold may be a known signal-to-noise ratio that is allows a participant to easily ignore the noise (e.g., over-air signal). This threshold can be either manually or electronically configured and adjusted based on user preferences. In one example, if a participant is continually increasing his/her own volume when a duplicate signal is detected during a conference call, then the threshold may be automatically increased. In an alternative embodiment, the threshold may be used in a raw comparison against over-air signal volume to determine how the electronic duplicate should be treated.

In the event that the volume difference does not one of meet and exceed the predetermined threshold, then the method continues to step 520 where the duplicated electronic version of the received over-air signal is cancelled from the call. However, in the event that the volume difference is greater than the predetermined threshold, then the signal-to-noise ratio is assumed to be adequate and the duplicate call signal is kept in the total signal of the conference (step 532).

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method of processing a voice signal, comprising:
   (a) detecting, at a microphone of a second communication endpoint, a first over-air signal from a user of a first communication endpoint, the first over-air signal having a first set of characteristics, wherein the second communication endpoint and the first communication endpoint are in physical proximity;
   (b) monitoring a call on the second communication endpoint for a second electrical signal received at a network interface of the second communication endpoint, the second electrical signal having a second set of characteristics substantially similar to the first set of characteristics;
   (c) detecting, at the second communication endpoint, the second electrical signal; and
   (d) in response to step (c), performing at least one of the following, for a user at the second communication endpoint:
      (i) canceling out substantially the detected second electrical signal from the call;
      (ii) increasing a volume of the call to render the detected first over-air signal substantially inaudible in comparison to the detected second electrical signal; and
      (iii) substantially muting the call to render the detected second electrical signal substantially inaudible in comparison to the detected first over-air signal.

2. The method of claim 1, wherein the first set of characteristics comprise at least one of frequency, pitch, tone, amplitude, words, overall waveform, and speaker identity in common with the second set of characteristics.

3. The method of claim 1, wherein substep (i) is performed and wherein canceling comprises adding a signal to the call that when added to the electrical signal renders the second electrical signal inaudible.

4. The method of claim 1, further comprising:
   determining a difference between the volume of the call to a volume of the first over-air signal;
   comparing the difference to a predetermined threshold;
   determining that the difference fails to one of meet and exceed the threshold; and
   thereafter, performing step (d).

5. The method of claim 1, further comprising:
   comparing a volume of the first over-air signal to a predetermined threshold;
   when the volume of the first over-air signal one of meets and exceeds the threshold, performing step (d); and
   when the volume of the first over-air signal fails to one of meet and exceed the threshold, skipping step (d).

6. The method of claim 1, wherein the first over-air signal is received by a recipient user and the second electrical signal is directed to the recipient user.

7. The method of claim 6, wherein a source of the first over-air signal and second electrical signal is proximate the recipient user.

8. The method of claim 1, wherein the call comprises at least one of a telephone call, a VoIP call, and a cellular call.

9. A computer readable storage medium comprising processor-executable instructions that, when executed by a processor, perform the steps of claim 1.

10. A telecommunication device, comprising:
    an input operable to receive an over-air signal from a user communicating with a second communication device, wherein the telecommunication device and the second communication device are in physical proximity;
    a communication interface operable to receive electrical signals transmitted by the second communications endpoint;
    a comparator function operable to compare characteristics of over-air signals received at the input to characteristics of electrical signals received at the communication interface; and
    a voice cancellation agent operable to determine that a received electrical signal has at least one characteristic in common with a characteristic of a received over-air signal and perform at least one of the following functions for a user of the second communication device:
    (i) cancel out at least a portion of the received electrical signal from the call;
    (ii) increase a volume of the call to render the received over-air signal substantially inaudible in comparison to the received electrical signal; and
    (iii) substantially mute the call to render the received electrical signal substantially inaudible in comparison to the received over-air signal.

11. The device of claim 10, wherein the input comprises an acoustic sound wave to electrical signal transducer.

12. The device of claim 10, wherein at least one of the comparator function and voice cancellation agent comprise processor executable instructions stored in a portion of memory resident on the device.

13. The device of claim 10, wherein characteristics of the over-air signals and electrical signals comprise at least one of frequency, amplitude, words, overall waveform, and speaker identity.

14. The device of claim 10, wherein the voice cancellation agent is operable to cancel out at least a portion of the received electrical signal by inverting a matching portion of the received over-air signal and adding the inverted matching portion of the received over-air signal to the call.

15. The device of claim 10, wherein the comparator function is operable to determine a difference between the volume of the call to a volume of the received over-air signal, compare the difference to a predetermined threshold, and cause the voice cancellation agent to perform one of its functions when the difference fails to one of meet and exceed the threshold.

16. The device of claim 10, wherein the comparator function is operable to compare a volume of the received over-air signal to a predetermined threshold and cause the voice cancellation agent to perform one of its functions when the volume of the over-air signal one of meets and exceeds the threshold.

17. A telecommunication system, comprising:
    means for detecting a first over-air signal at a second communication endpoint, the first over-air signal being created by a user of a first communication endpoint and having a first set of characteristics, wherein the second communication endpoint and the first communication endpoint are in physical proximity;

means for monitoring a call, at the second communication endpoint for a second electrical signal transmitted by the first communication endpoint having a second set of characteristics substantially similar to the first set of characteristics;

means for detecting the second electrical signal; and means for rendering the second electrical signal inaudible for a user of the second communications endpoint when compared to the first over-air signal.

18. The system of claim 17, wherein the second electrical signal is rendered inaudible by one of canceling the electrical signal from the call and muting the call.

19. The system of claim 17, wherein the means for detecting a first over-air signal comprises an acoustic sound wave to electrical signal transducer.

20. The system of claim 17, wherein the first set of characteristics comprise at least one of frequency, amplitude, words, overall waveform, and speaker identity in common with the second set of characteristics.

21. The system of claim 17, wherein the means for rendering the second electrical signal inaudible when compared to the first over-air signal is operable to add a signal to the call that when added to the second electrical signal cancels the electrical signal.

* * * * *